United States Patent [19]

Prenzel et al.

[11] Patent Number: 5,326,247
[45] Date of Patent: Jul. 5, 1994

[54] PASTE EXTRUDER

[75] Inventors: Karl Prenzel, Schwabach; Heinrich Bergner, Adelsdorf, both of Fed. Rep. of Germany

[73] Assignee: WK Worek Kunststofftechnik GmbH, Adelsdorf/Neuhaus, Fed. Rep. of Germany

[21] Appl. No.: 971,903
[22] PCT Filed: Apr. 24, 1992
[86] PCT No.: PCT/DE92/00326
§ 371 Date: Dec. 28, 1992
§ 102(e) Date: Dec. 28, 1992
[87] PCT Pub. No.: WO92/19435
PCT Pub. Date: Nov. 12, 1992

[30] Foreign Application Priority Data

Apr. 25, 1991 [DE] Fed. Rep. of Germany ....... 9105099

[51] Int. Cl.$^5$ ............................................ B29C 47/66
[52] U.S. Cl. ................................... 425/185; 425/190; 425/381; 425/467
[58] Field of Search ............... 425/190, 191, 185, 208, 425/376.1, 380, 381, 583, 466–468

[56] References Cited

U.S. PATENT DOCUMENTS

| | | | |
|---|---|---|---|
| 2,734,226 | 2/1956 | Willert | 425/583 X |
| 2,941,240 | 6/1960 | Distler | 425/191 |
| 3,898,831 | 8/1975 | Kahlefeld | 72/263 |
| 4,360,332 | 11/1982 | Cyin | 425/191 |
| 4,565,512 | 1/1986 | Wills et al. | 425/376.1 X |
| 4,714,422 | 12/1987 | Meeker et al. | 425/376.1 X |
| 4,731,006 | 3/1988 | Freda et al. | 425/376.1 X |

FOREIGN PATENT DOCUMENTS

| | | |
|---|---|---|
| 326898 | 1/1976 | Austria . |
| 684338 | 11/1939 | Fed. Rep. of Germany . |
| 1504068 | 8/1969 | Fed. Rep. of Germany . |
| 9011448 | 1/1991 | Fed. Rep. of Germany . |
| 1437274 | 3/1966 | France . |
| 247495 | 12/1947 | Switzerland . |

*Primary Examiner*—Richard L. Chiesa
*Attorney, Agent, or Firm*—Spencer, Frank & Schneider

[57] ABSTRACT

An apparatus for extruding plastic tubing includes a machine stand; an extrusion cylinder supported by the machine stand; a housing supported on the machine stand; a hollow extrusion piston introducible into and withdrawable from the extrusion cylinder; an extrusion drive accommodated in the housing and connected to the extrusion piston for advancing the extrusion piston into and for withdrawing the extrusion piston from the extrusion cycliner; an mandrel pulling rod mounted in, and axially displaceable relative to, the hollow extrusion piston; a mandrel affixed to the mandrel pulling rod and moving as a unit with the mandrel pulling rod for introduction into and withdrawal from the extrusion cylinder; and a mandrel actuating drive circumferentially surrounded by a sleeve-shaped component of the extrusion drive in the housing and connected to the mandrel pulling rod for axially displacing the mandrel pulling rod.

12 Claims, 4 Drawing Sheets

PASTE EXTRUDER

BACKGROUND OF THE INVENTION

The invention relates to a paste extruder for making hollow articles (profiles), for example, plastic pipes or tubes, particularly of polytetrafluorethylene (PTFE). The extruder includes a machine stand to which are attached an extrusion cylinder having an extrusion mouthpiece to receive a preform composed of the plastic to be extruded; and an extrusion drive for an extrusion piston that can be driven into the extrusion cylinder and thus effects the extrusion of the plastic material. The extruder further includes a mandrel pulling rod that is axially displaceably mounted within the extrusion piston and is movable by a mandrel positioning drive for positioning a mandrel that is fixed to the rod end and cooperates with the extrusion mouthpiece to form the hollow article.

Because of their structural length, such paste extruders require a significant amount of space. A substantial structural length for the paste extruder is needed, because the preforms may have a length of up to 2 m, and the stroke of the extrusion piston must correspond to this length. If additionally the extrusion cylinder is to be charged in the advantageous manner of a breechloader, the extrusion piston must be pulled out of the extrusion cylinder to such an extent during the charging process that sufficient space for the introduction of the preform exists between its pressure face and the extrusion cylinder. This space must generally be significantly larger than the length of the preform because in preferred configurations of such extruders the mandrel shaping the interior profile of the article projects beyond the pressure face of the extrusion piston.

Because of the resulting structural lengths of such extruders, they are frequently designed for a vertical extrusion direction. This, however, requires a correspondingly tall operating space which is in part inconsistent with the multi-purpose use of such extruders.

Such extruders require considerable pressures of up to, for example, 1000 bar to drive the extrusion piston. The drives for the extrusion piston must be dimensioned correspondingly large. It is thus customary to have several cooperating drive assemblies act jointly on the extrusion piston. Furthermore, a drive assembly required to axially position the mandrel must be added to the drive assemblies. Thus, the prior art paste extruders of the above-mentioned type, in addition to the significant great structural length, also have a considerable structural width and height.

SUMMARY OF THE INVENTION

It is an object of the invention to provide an improved paste extruder of the above-discussed type which has reduced spatial requirements compared to prior art structures.

This object and others to become apparent as the specification progresses, are accomplished by the invention, according to which, briefly stated, the mandrel positioning drive is surrounded (encapsulated) by the extrusion drive and both drives are disposed in a common housing.

The compact configuration according to the invention is of increased significance if additional drive and positioning means are present. It is generally important that the paste extruder does not project far radially with respect to its longitudinal axis extending in the extrusion direction.

According to a further feature of the invention, if the extrusion piston is retracted from the extrusion cylinder, the common housing together with its drives is pivotal about a pivot axis that is disposed approximately at a right angle to the longitudinal axis of the extrusion piston. Such an arrangement additionally provides for a short structural length in spite of the fact that the extrusion cylinder is recharged as a breechloader. The small structural width or height also favorably affects the space requirement of the paste extruder if its components, when pivoted out, do not project significantly beyond the dimensions in the operating position. In order to make available the axially effective space required to reload the preform from the rear into the extrusion cylinder, the extrusion piston has to be pulled out of the extrusion cylinder only to the extent that the mandrel lies just outside the extrusion cylinder. Then a comparatively slight pivoting movement of the entire drive unit is sufficient to make available the space required for reloading a preform from the drive side.

According to yet another feature of the invention, the pivot axis is disposed midway between the axial ends of the housing. This arrangement ensures that, in the outwardly pivoted position, the ends of the drive unit have been swung out of the center position by about the same radial extent.

In a further feature of the invention the pivot axis is oriented approximately horizontally and so positioned that the weight of the masses of the housing and the drives disposed on both sides of the pivot axis is in equilibrium. Such an arrangement permits the use of a comparatively weak (low-power) pivot drive. Moreover, this facilitates a precise adjustment of the extrusion piston before it is re-introduced into the extrusion cylinder at the beginning of a new extrusion process. The fact that such a precise adjustment is at all possible, is of particular significance for a continuous operation of such a paste extruder. The compact configuration of the subject matter of the invention is of particular significance for this important, precise adjustability. Thus the masses that need to be moved for adjustment purposes are arranged in an advantageous proximity of the pivot axis.

DESCRIPTION OF THE PREFERRED EMBODIMENTS

Figure 1:
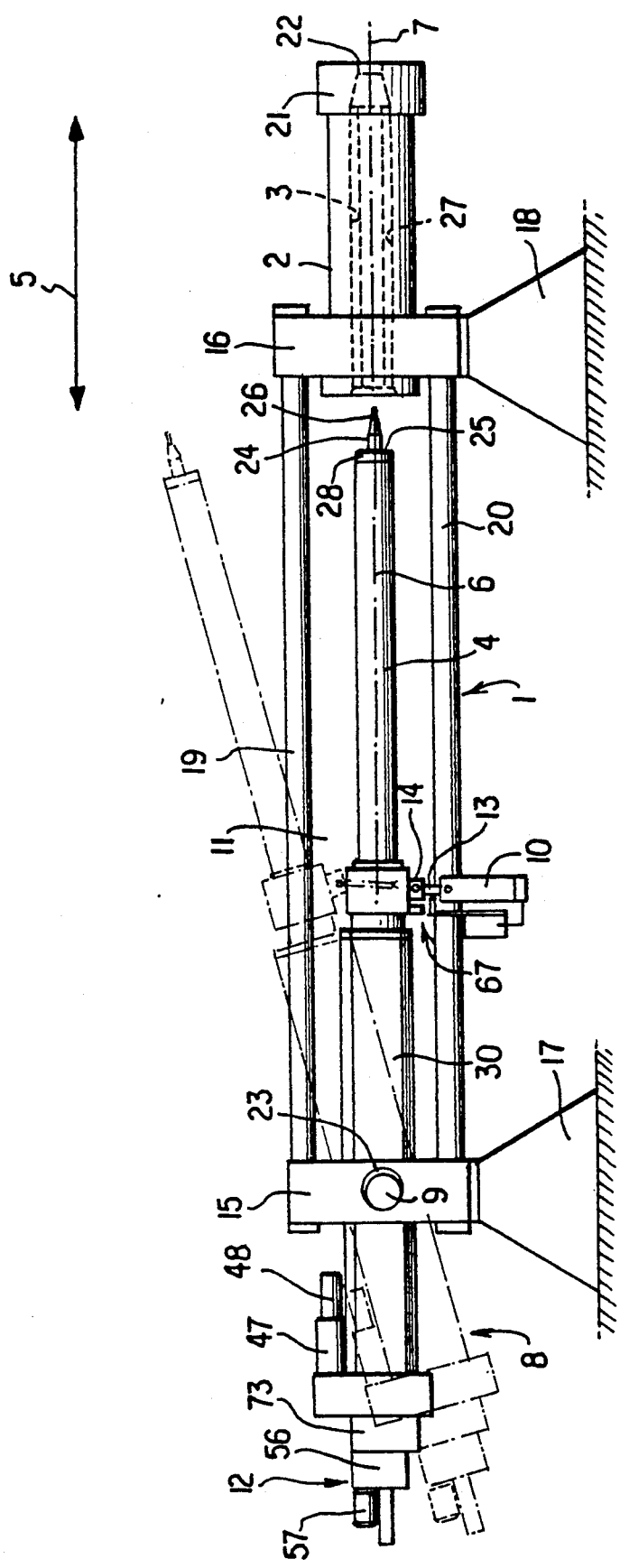
FIG. 1 is a side elevational view of a preferred embodiment of a paste extruder in which the extrusion piston advances in the horizontal direction and which has an extrusion piston drive unit that is shown in the extruding position and, in phantom lines, in an outwardly pivoted position.

Turning to FIG. 1, the paste extruder is essentially composed of an extrusion cylinder 2 that is fixed within a machine stand 1 to receive a preform 3 to be extruded and an extrusion piston 4 which can be driven into extrusion cylinder 2. The entrance and advancing direction 5 of extrusion piston 4 extends parallel to its central longitudinal axis 6 and the central longitudinal axis 7 of extrusion cylinder 2.

Extrusion piston 4 is driven by a drive unit which, as a whole, is designated at 8 and is disposed behind the extrusion piston 4 facing away from extrusion cylinder 2. The drive unit 8 is pivotal in machine stand 1 about a pivot shaft 9 which extends approximately horizontally and approximately perpendicularly to the axis 6 of extrusion piston 4. The pivot shaft is positioned approximately midway between the front end 11 and the rear end 12 of the drive unit 8 so that the latter and extrusion piston 4 together act as a two-armed lever or rocker. A pressure cylinder 10 is provided to apply a force to the drive unit 8 to cause pivotal motions thereof. The pressure cylinder 10 whose fixed end is attached to machine stand 1 radially engages the front end 11 of drive unit 8. The piston rod 13 of pressure cylinder 10 is connected with drive unit 8 by way of an eyelet joint 14.

Machine stand 1 is essentially composed of two spaced parallel and approximately square frame stands 15 and 16 that are arranged at a right angle to the axis 6 of extrusion piston 4 and are each supported by a base stand 17 and 18. Frame stands 15 and 16 are connected with one another by means of four longitudinal transverse members 19, 20 that are disposed at the respective frame stand corners.

The rear end of extrusion cylinder 2 facing extrusion piston 4 is disposed centrally in the front frame stand 16 and is affixed thereto. An extrusion mouthpiece 21 and an extrusion nozzle 22 which determines the outer diameter of the hollow article to be extruded are disposed at the front end of the extrusion cylinder 2.

Figure 3:
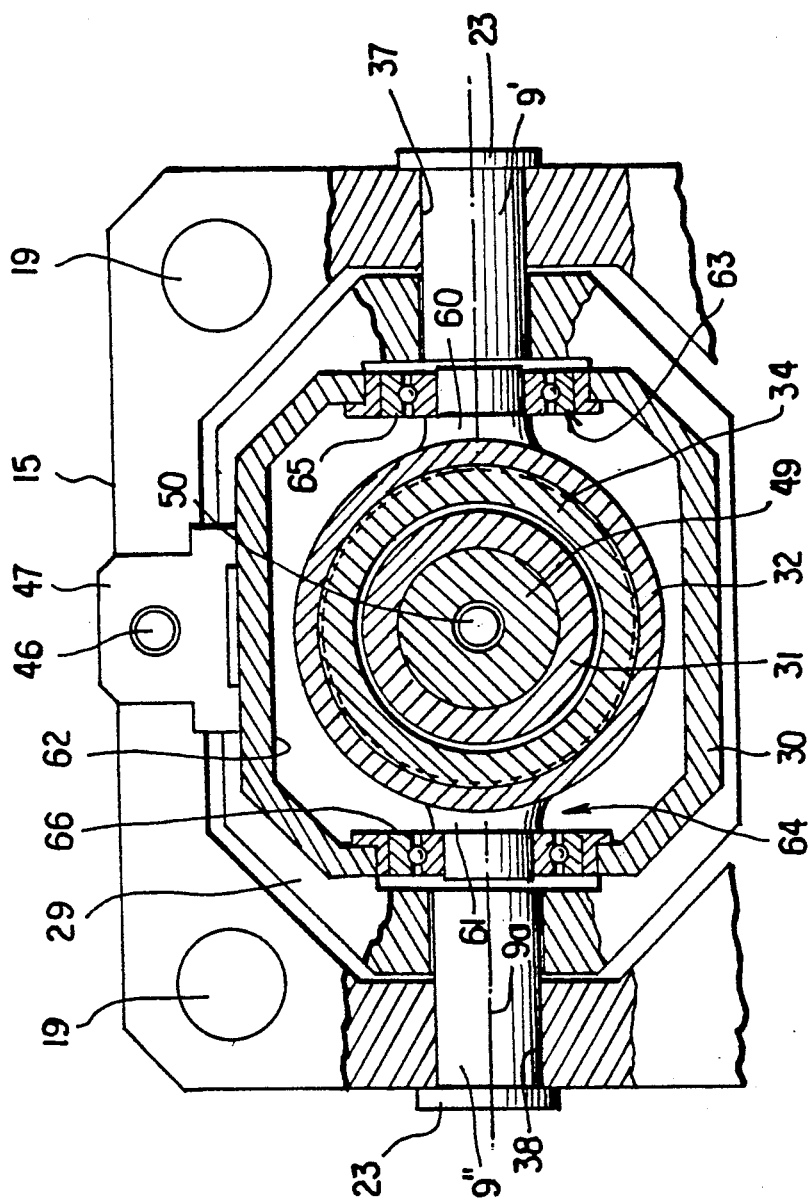
FIG. 3 is a sectional view taken along line III—III of FIG. 2.

Also referring to FIG. 3, drive unit 8 is disposed in the rear frame stand 15 approximately midway between the front and rear ends 11, 12. The pivot shaft 9, having a pivot axis 9a is supported in bearings 23 in the stand 15. Bearings 23 are fastened to the exterior of frame stand 15 and, for adjustment of pivot shaft 9, are configured as eccentric rings. To fasten the pivot shaft 9, which is composed of two halves 9' and 9", to housing 30, an annular flange 29 is formed on its periphery. The annular flange is provided with two diametrally oppositely disposed blind-bore-like recesses 37 and 38 in which the ends of shaft halves 9' and 9" facing housing 30 are fixed.

A mandrel pulling rod 24 is mounted centrally within extrusion piston 4 so as to be coaxially displaceable. The front end of the rod 24 projects from the frontal pressure face 25 of extrusion piston 4 and is, at that location, releasably connected with a mandrel 26.

A sealing disc 28 which cooperates with the interior surface 27 of extrusion cylinder 2 is disposed on the pressure face 25 of extrusion piston 4.

Figures 2, 2A:
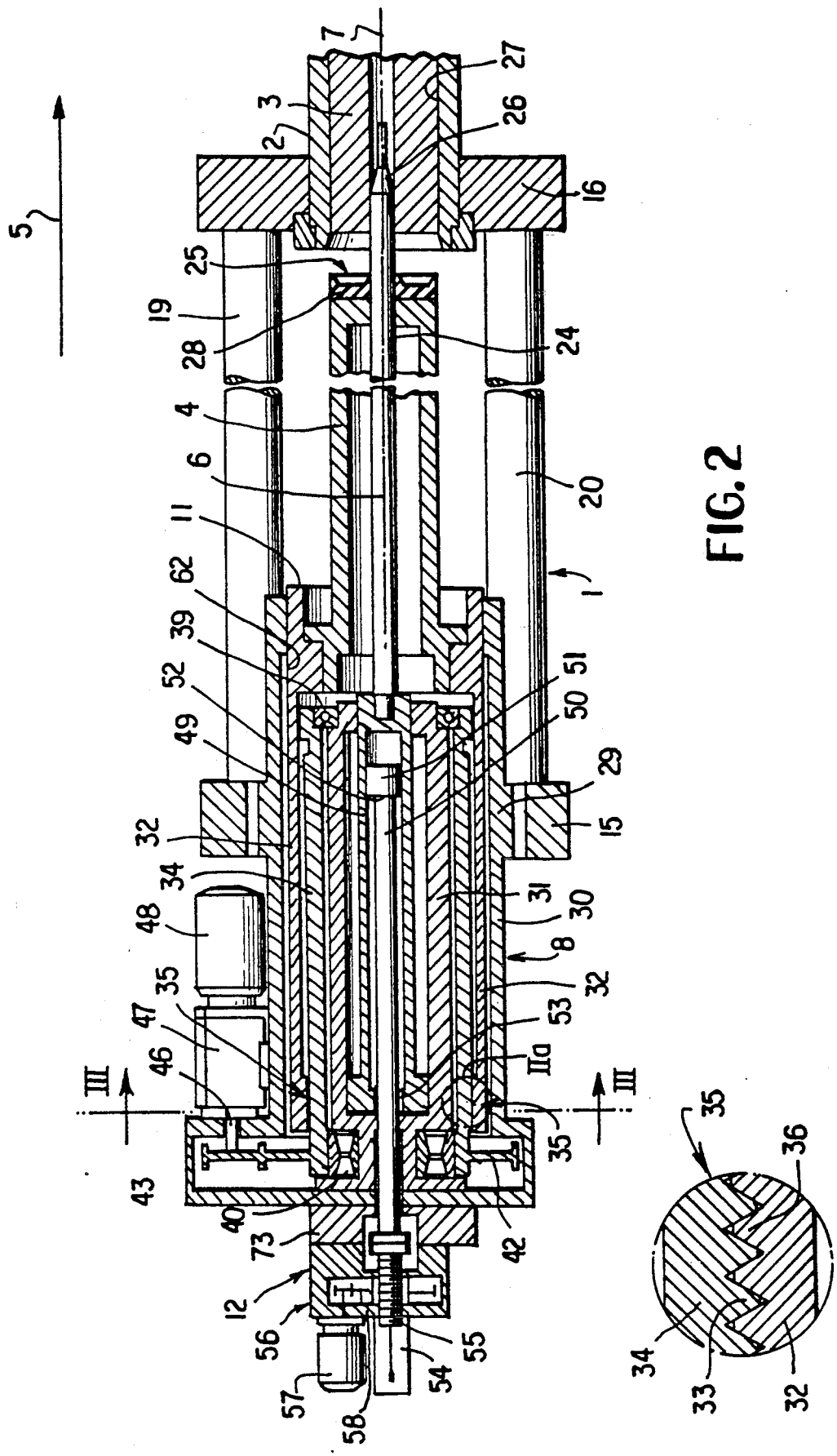
FIG. 2 is an axial sectional view of the paste extruder shown in FIG. 1.
FIG. 2a is an enlarged view of the circular inset in FIG. 2.

The structure of drive unit 8 will now be described in greater detail with reference to FIGS. 2, 2a and 3. Drive unit 8 includes a housing 30 which accommodates the extrusion drive for extrusion cylinder 4 and the positioning drive for the axially displaceable mandrel pulling rod 24 and a mandrel 26 disposed at the front end of the rod 24.

The positioning drive for mandrel pulling rod 24 and mandrel 26 is a hydraulic cylinder 31 which is disposed centrally within housing 30 and coaxially with the longitudinal axis 6 of extrusion cylinder 4. The driven member for the extrusion drive is a hollow cylinder 32 coaxially surrounding hydraulic cylinder 31 and connected at its front end with extrusion piston 4. A hollow spindle 34 which is provided with an external thread 33 is disposed between hydraulic cylinder 31 and hollow cylinder 32. The rear end 35 of hollow cylinder 32 facing away from extrusion piston 4 is provided with an internal thread 36 that is in engagement with the external thread 33 of hollow spindle 34 to form a spindle drive. The front and rear ends of hollow spindle 34 are supported by means of roller bearings 39 and 40 which are supported at the housing of hydraulic cylinder 31. A spur gear 42 projects radially from the circumference of the rear end of the hollow spindle 34 and is in driving engagement with a spur gear 43. Through the intermediary of a gear assembly 47 and by way of a drive shaft 46 projecting from the housing 30, the spur gear 43 is connected with an electric motor 48. Gear assembly 47 and electric motor 48 are fixed to the exterior of housing 30 in a longitudinal axial orientation.

The piston 49 of hydraulic cylinder 31 is hollow and coaxially and displaceably receives a rod 50. The front end 51 of the rod 50 facing extrusion cylinder 2 is provided with an abutment face 52 that cooperates with a drive-side interior ring collar 53 of piston 49. The adjustment end 54 of rod 50 facing away from abutment face 52 is provided with an external thread 55 and projects from housing 30. The adjustment drive 56 for rod 50 is flanged to the rear end face of housing 30 and includes an electric motor 57 and a gear assembly 58 which cooperates with the external thread 55 of rod 50 as a screw drive.

The hollow cylinder 32 constituting the driven member of the extrusion drive is provided at its rear end 35 with two diametrally oppositely disposed, radially outwardly extending projections 60 and 61 which are guided in guide rails 63 and 64 that are disposed in the interior wall 62 of housing 30 and extend parallel to the axis 6 of extrusion piston 4. Projections 60 and 61 are supported by means of roller bearings 65 and 66 in guide rails 63 and 64.

Figure 4:
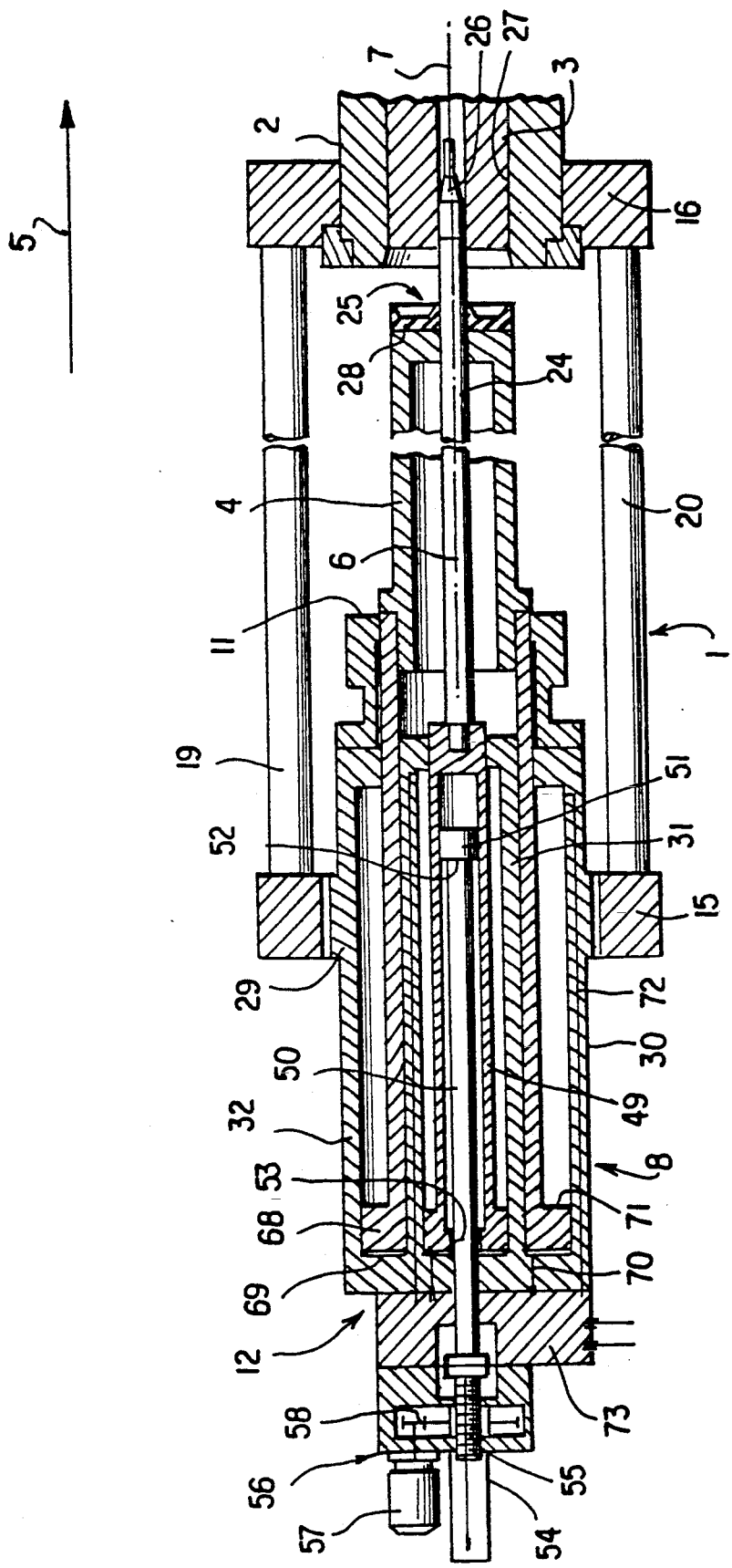
FIG. 4 is an axial sectional view of another preferred embodiment of the invention.

FIG. 4 shows an embodiment of a paste extruder in which the hollow cylinder 32, constituting the driven member of extrusion piston 4 is driven hydraulically, rather than by a spindle drive as in the earlier-described embodiment. For this purpose, the rear end 35 of hollow cylinder 32 is provided with an annular flange 68 that projects radially from its outer circumference. The flange 68 is sealingly fitted into the cross-sectionally circular housing 30 for acting as a hydraulic piston. To advance extrusion piston 4, the rear end face 69 of annular flange 68 is charged with hydraulic oil through conduit 70. For the return stroke, the inner ring face 71 of annular flange 68 facing away from end face 69 is charged with hydraulic oil through a conduit 72. A control plate 73 for controlling the hydraulic drive is disposed between adjustment drive 56 and housing 30. Such a control plate 73 is also provided in the embodiment shown in FIGS. 1-3.

The outer circumferential surface of hydraulic cylinder 31, which serves as the positioning drive for mandrel pulling rod 24, and the inner circumferential face of hollow cylinder 32 cooperate as a slide bearing.

To recharge a preform 3 in extrusion cylinder 2 in the apparatus according to the invention, the extrusion piston 4 is initially retracted into its rearward starting position in which the front end of extrusion piston 4 is disposed outside of extrusion cylinder 2. Thereafter, or simultaneously with the retraction of extrusion piston 4, mandrel pulling rod 24 and mandrel 26 are also retracted to such an extent that mandrel 26 is disposed outside of extrusion cylinder 2. Then pressure cylinder 10 is actuated, whereupon its piston rod 13 extends and pivots drive unit 8 together with extrusion piston 4 about pivot shaft 9 so that drive unit 8 and extrusion piston 4 assume an outwardly-pivoted position shown in dashed lines in FIG. 1. The pivoting motion occurs about an angle of approximately 20. Such an angle is sufficient to make available sufficient space in the rear region of extrusion cylinder 2 for the preform 3 that is to be introduced into extrusion cylinder 2 in a breechloading manner.

After insertion of preform 3 into extrusion cylinder 2, retraction of piston rod 13 of pressure cylinder 10 causes drive unit 8 and extrusion piston 4 to be returned to the extrusion position. In this position, extrusion piston 4 must be aligned in such a manner that its central longitudinal axis 6 is in a linear alignment with the central longitudinal axis 7 of extrusion cylinder 2. A subsequent adjustment in the vertical direction required, for example, due to a slight bend in extrusion piston 4 may be effected by means of a vertical adjustment device 67 that is disposed at machine stand 1 near pressure cylinder 10.

It will be understood that the paste extruder according to the invention may be operated to extrude in the horizontal as well as the vertical direction.

It will be understood that the above description of the present invention is susceptible to various modifications, changes and adaptations, and the same are intended to be comprehended within the meaning and range of equivalents of the appended claims.

We claim:

1. An apparatus for extruding plastic tubing, comprising
   (a) a machine stand;
   (b) an extrusion cylinder supported by said machine stand; said extrusion cylinder including an interior space for receiving a plastic preform to be extruded from said cylinder;
   (c) a housing;
   (d) mounting means for supporting said housing on said machine stand;
   (e) a hollow extrusion piston introducible into and withdrawable from said extrusion cylinder;
   (f) an extrusion drive means positioned in said housing and connected to said extrusion piston for advancing said extrusion piston into and for withdrawing said extrusion piston from said extrusion cylinder; said extrusion drive means including a hollow cylinder forming a driven member of said extrusion drive means and being coupled to said hollow extrusion piston;
   (g) a mandrel pulling rod mounted in, and axially displaceable relative to, said hollow extrusion piston;
   (h) a mandrel affixed to said mandrel pulling rod and moving as a unit with said mandrel pulling rod; said mandrel being introducible into and withdrawable from said extrusion cylinder; and
   (i) mandrel actuating means circumferentially surrounded by said hollow cylinder of said extrusion drive means in said housing and connected to said mandrel pulling rod for axially displacing said mandrel pulling rod.

2. The apparatus as defined in claim 1, wherein said mandrel actuating means is coaxially disposed in said extrusion drive means.

3. The apparatus as defined in claim 1, wherein said extrusion drive means comprises a screw drive connected to said hollow cylinder.

4. The apparatus as defined in claim 1, wherein said extrusion drive means comprises a hydraulic drive connected to said hollow cylinder.

5. The apparatus as defined in claim 1, wherein said hollow extrusion piston has a longitudinal axis and further wherein said mounting means comprises pivot means for pivotally securing said housing to said machine stand to provide for a pivotal motion of said housing, said extrusion drive means, said hollow extrusion piston, said mandrel actuating means and said mandrel pulling rod as a unit about a pivot axis substantially perpendicular to said longitudinal axis to swing said hollow extrusion piston and said mandrel pulling rod away from said extrusion cylinder, whereby space is provided for breechloading a preform into said extrusion cylinder.

6. The apparatus as defined in claim 5, wherein said housing has opposite axial ends; further wherein said pivot axis is situated approximately midway between said opposite axial ends.

7. The apparatus as defined in claim 5, wherein said pivot axis has a substantially horizontal orientation.

8. The apparatus as defined in claim 7, wherein said pivot is so positioned that the masses of said housing and components supported thereby are, on both sides of said pivot axis, in equilibrium.

9. The apparatus as defined in claim 5, further comprising power means for effecting a pivotal motion of said housing about said pivot axis.

10. The apparatus as defined in claim 5, further comprising adjusting means for adjusting a position of said pivot axis relative to said machine stand.

11. The apparatus as defined in claim 5, further comprising adjusting means for adjusting a pivoted position of said housing relative to said machine stand.

12. An apparatus for extruding plastic tubing, comprising
   (a) a machine stand;
   (b) an extrusion cylinder supported by said machine stand; said extrusion cylinder including an interior space for receiving a plastic preform to be extruded from said cylinder;
   (c) a housing;
   (d) mounting means for supporting said housing on said machine stand;
   (e) a hollow extrusion piston introducible into and withdrawable from said extrusion cylinder;
   (f) an extrusion drive means positioned in said housing and connected to said extrusion piston for advancing said extrusion piston into and for withdrawing said extrusion piston from said extrusion cylinder; said extrusion drive means including a hollow cylinder;
   (g) a mandrel pulling rod mounted in, and axially displaceable relative to, said hollow extrusion piston;
   (h) a mandrel affixed to said mandrel pulling rod and moving as a unit with said mandrel pulling rod; said mandrel being introducible into and withdrawable from said extrusion cylinder; and
   (i) mandrel actuating means circumferentially surrounded by said hollow cylinder of said extrusion drive means in said housing and connected to said mandrel pulling rod for axially displacing said mandrel pulling rod; said mandrel actuating means comprising a hollow mandrel-driving piston connected to said mandrel pulling rod and hydraulic means for displacing said mandrel-driving piston;

(j) an adjustable abutment means for limiting a stroke of said mandrel-driving piston; said adjustable abutment means comprising an abutment member slidably received in said mandrel-driving piston; and (k) motor means connected to said abutment member for axially displacing said abutment member; said motor means comprising a spindle drive connected to said abutment member and being mounted on said housing coaxially with said extrusion drive means and said mandrel actuating means.

* * * * *